Figure 1:
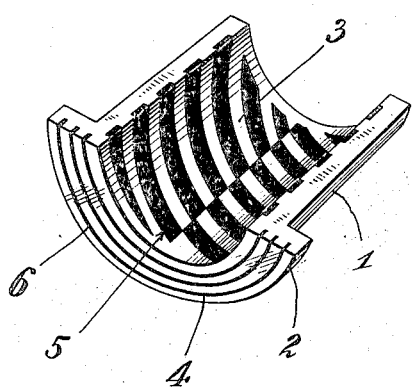

E. G. ACHESON, Jr.
BEARING.
APPLICATION FILED JAN. 31, 1921.

1,398,220. Patented Nov. 29, 1921.

Inventor
Edward G. Acheson Jr.
By his Attorneys
Pennie Davis Marvin & Edmonds

UNITED STATES PATENT OFFICE.

EDWARD GOODRICH ACHESON, JR., OF NIAGARA FALLS, NEW YORK.

BEARING.

1,398,220.   Specification of Letters Patent.   Patented Nov. 29, 1921.

Application filed January 31, 1921. Serial No. 441,164.

*To all whom it may concern:*

Be it known that I, EDWARD G. ACHESON, Jr., a citizen of the United States, residing at Niagara Falls, in the county of Erie, State of New York, have invented certain new and useful Improvements in Bearings; and I do hereby declare the following to be a full, clear, and exact description of the invention, such as will enable others skilled in the art to which it appertains to make and use the same.

My invention is an improvement in bearings, and relates to bearings of the oilless type, wherein the bearing has incorporated therewith segregated masses of lubricant bearing material, adapted to lubricate the bearing surfaces continuously by contact therewith.

An object of the invention is to provide in a bearing of the character specified, means for enabling a pure, unctuous, amorphous graphite to be used as the lubricating agent, without the necessity for an admixture of a bonding material.

Figure 2:
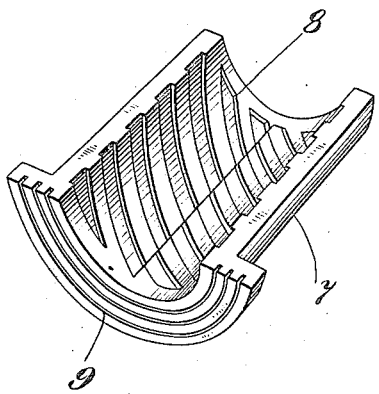
Figure 3:
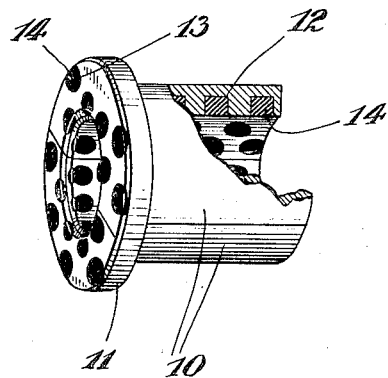
Figure 4:
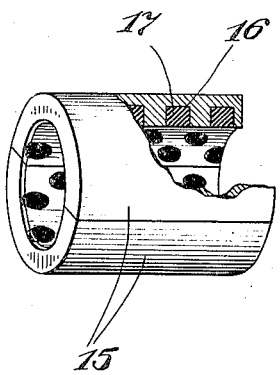

In the drawings;

Figure 1 is a perspective view of a bearing section constructed in accordance with the invention, Fig. 2 is a similar view of the section before the placing of the lubricating agent, Figs. 3 and 4 are perspective views with parts in section showing other embodiments of the invention.

That type of bearing or bushing known as an oilless bearing, is in the form of a bearing or bushing of metal, having in the inner face thereof recesses of various outline, as for instance slots, grooves, or cylindrical openings, in which are pressed graphite mixed with a bonding material, which becomes hard when it is baked. The bushing or bearing so formed is then machined to size in the usual way. In the manufacture of such bushings and bearings at the present time, the superior lubricating values of a pure unctuous, amorphous graphite are not available, because of the fact that too great a proportion of bonding agent is required to properly hold the segregated masses of the lubricating agent in place in the recesses of the metal portion of the bearing. Hence it has been necessary to make use of a relatively impure graphite, having a coarse, hard physical structure, such for instance as that character of graphite known as flake graphite. The present invention enables a pure, unctuous amorphous graphite to be used. This graphite is carried by fibrous material, as for instance cellulose fiber, the material being impregnated with the graphite, or graphitized, as described in my prior application, Serial No. 430,711, filed December 14, 1920. The fiber so graphitized is cut or otherwise formed into suitable shape, as for instance strips, plugs, or the like, and these strips or plugs are pressed into the recesses of the metal body of the bearing. In Fig. 1 there is shown a bearing section, consisting of a body 1 and a flange 2 at one end. The body has on its inner face spirally extending grooves or slots 3, and the outer face of the flange 2 has arc shaped slots or grooves 4. Within these grooves 3 there are arranged strips 5 of graphitized fiber, or fiber impregnated with a pure unctuous amorphous graphite in the manner set forth in my above mentioned prior application. These strips are pressed tightly into the grooves, which have been cast in the metal blank. The grooves 4 have similar strips indicated at 6. After the strips have been placed, the bearing may be machined in the usual manner, or the strips may be placed after machining, it being understood that their outer faces are flush with the bearing surface. In Fig. 2 there is shown a blank 7, having the grooves 8 and 9 in the body, and flange respectively. It will be obvious that any form of groove may be used, the spiral arrangement being preferable, because of the fact that every part of the shaft contacts with the segregated masses of fiber during the rotation thereof. In Fig. 3 there is shown a bearing consisting of similar sections 10, which are flanged at one end as indicated at 11. The inner or bearing surfaces of the sections, as well as the bearing surface of the flange 11 have cylindrical recesses 12 and 13 respectively, and within these recesses cylindrical plugs 14 of the graphitized fiber are inserted, the said plugs having their bearing faces flush with the bearing surface of the sections. In Fig. 4 the sections 15 are not flanged, but they have the cylindrical recesses 16 which hold the plugs 17 of graphitized fiber. In both Figs. 3 and 4 the plugs are arranged in rows or lines extending longitudinally of the sections, and the plugs of each line are staggered with respect to the plugs of adjacent lines, in order that every portion of the shaft will engage the plugs during its rotation. With these arrangements no bonding agent is necessary, and a pure graphite may be used.

I claim.

1. A bearing of the character specified, having recesses in the inner face thereof, and filling members of vulcanized fiber impregnated with graphite held in the recesses.

2. A bearing of the character specified, having recesses in the inner face thereof, filling members of vulcanized fiber impregnated with graphite held in the recesses, said members being flush at their bearing faces with the engaging surface of the bearing.

3. A bearing of the character specified, having recesses in the inner face thereof, filling members of vulcanized fiber impregnated with graphite held in the recesses, said members being flush at their bearing faces with the engaging surface of the bearing, and arranged in such manner that the shaft will be engaged throughout its extent with the filling members during its rotation.

4. A bearing of the character specified, having recesses in the inner face thereof, and filling members of vulcanized fiber impregnated with graphite held in the recesses, and so arranged that during the rotation of the member held in the bearing, every part of such member will be contacted with the filling members.

5. A bearing of the character specified, having the bearing face thereof inlaid with masses of vulcanized fiber impregnated with graphite.

6. A bearing of the character specified, having the bearing face thereof inlaid with masses of vulcanized fiber impregnated with graphite, so arranged that during the rotation of the element turning in the bearing, every part of such element will be contacted with the inlay.

7. A bearing of the character specified, having the bearing face thereof inlaid with vulcanized fiber impregnated with graphite.

8. A bearing of the character specified, having in the bearing face thereof inlays of vulcanized fiber impregnated with lubricant.

In testimony whereof I affix my signature.

EDWARD GOODRICH ACHESON, Jr.